(12) United States Patent
Chen et al.

(10) Patent No.: US 10,018,415 B2
(45) Date of Patent: Jul. 10, 2018

(54) INTEGRATED SOLAR ENERGY DRYING SYSTEM

(71) Applicant: ZHONGYING CHANGJIANG INTERNATIONAL NEW ENERGY INVESTMENT CO., LTD., Wuhan (CN)

(72) Inventors: Yilong Chen, Wuhan (CN); Shuchuan Hu, Wuhan (CN); Yanfeng Zhang, Wuhan (CN)

(73) Assignee: ZHONGYING CHANGJIANG INTERNATIONAL NEW ENERGY INVESTMENT CO., LTD., Wuhan (CN)

(*) Notice: Subject to any disclaimer, the term of this patent is extended or adjusted under 35 U.S.C. 154(b) by 192 days.

(21) Appl. No.: 14/975,887

(22) Filed: Dec. 21, 2015

(65) Prior Publication Data
US 2016/0102910 A1    Apr. 14, 2016

Related U.S. Application Data

(63) Continuation-in-part of application No. PCT/CN2014/080110, filed on Jun. 17, 2014.

(30) Foreign Application Priority Data

Jun. 21, 2013   (CN) .......................... 2013 1 0248978

(51) Int. Cl.
*F26B 19/00*     (2006.01)
*F26B 3/32*      (2006.01)
(Continued)

(52) U.S. Cl.
CPC ............... *F26B 3/286* (2013.01); *F24J 2/055* (2013.01); *F24J 2/34* (2013.01); *F26B 25/10* (2013.01);
(Continued)

(58) Field of Classification Search
CPC .. F26B 3/28; F26B 3/286; F26B 3/283; F26B 25/10; F26B 25/12; F24J 2/02;
(Continued)

(56) References Cited

U.S. PATENT DOCUMENTS 4,432,147 A * 2/1984 Chen ..................... F26B 3/286
34/542
5,065,528 A * 11/1991 Kaneko ................ F26B 3/286
34/181

(Continued)

*Primary Examiner* — John McCormack
(74) *Attorney, Agent, or Firm* — Matthias Scholl P.C.; Matthias Scholl

(57) ABSTRACT

An integrated solar energy drying system, including: a solar greenhouse, a solar energy storage bed, an air condenser, a wet dust collector, pipes, valves, and blowers. The solar greenhouse includes: a top side, three sunny sides, a shady side, floorboards, a gas inlet, and two gas outlets. The solar energy storage bed includes: an upper air box, a lower air box, a plurality of solar heat collecting-storing pipes, and a sealing chamber. Each solar heat collecting-storing pipe includes an air pipe. The air condenser includes: an air inlet, an air outlet, two gas chambers, and a bundle of gas pipes. The solar greenhouse, the solar energy storage bed, the air condenser, the wet dust collectors are connected via pipes. The valves and the blowers are disposed on the pipes.

20 Claims, 3 Drawing Sheets

(51) Int. Cl.
    *F26B 3/28*     (2006.01)
    *F24J 2/05*     (2006.01)
    *F24J 2/34*     (2006.01)
    *F28D 21/00*     (2006.01)
    *F26B 25/10*     (2006.01)
    *F26B 25/12*     (2006.01)

(52) U.S. Cl.
    CPC .......... F26B 25/12 (2013.01); F28D 21/0014 (2013.01); *Y02B 10/22* (2013.01); *Y02B 40/74* (2013.01); *Y02E 10/44* (2013.01)

(58) Field of Classification Search
    CPC .... F24J 2/0438; F24J 2/245; F24J 2/34; F24J 2/42; F24J 2002/0405; F24J 2/05; F24J 2/24; A01G 9/243
    USPC ............................................ 34/522, 512, 93
    See application file for complete search history.

(56)             References Cited

U.S. PATENT DOCUMENTS

2003/0024686 A1*   2/2003   Ouellette ............ C05F 17/0063
                                                                                                     165/47
2014/0360045 A1*   12/2014   Bartosik ................. F26B 21/08
                                                                                                     34/474

* cited by examiner

INTEGRATED SOLAR ENERGY DRYING SYSTEM

CROSS-REFERENCE TO RELATED APPLICATIONS

This application is a continuation-in-part of International Patent Application No. PCT/CN2014/080110 with an international filing date of Jun. 17, 2014, designating the United States, now pending, and further claims priority benefits to Chinese Patent Application No. 201310248978.5 filed Jun. 21, 2013. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to an integrated solar energy drying system.

Description of the Related Art

A typical method for drying agricultural products and biomass fuels is to combust conventional non-renewable energy sources, such as coal, petroleum, and natural gas, which produces harmful substances including $CO_2$, soot, sulfur compounds, and nitrogen oxides. In addition, the drying method has low thermal efficiency and high cost.

SUMMARY OF THE INVENTION

In view of the above-described problems, it is one objective of the invention to provide an integrated solar energy drying system that is able to utilize the solar energy through irradiation and convection, has much higher thermal efficiency and drying rate compared to common solar greenhouse. The integrated solar energy drying system is adapted to dehydrate and dry agricultural products and biomass fuels, and can operate at night.

To achieve the above objective, in accordance with one embodiment of the invention, there is provided an integrated solar energy drying system. The integrated solar energy drying system comprises: a solar greenhouse, a solar energy storage bed, an air condenser, a wet dust collector, pipes, valves, and blowers. The solar greenhouse comprises: a top side, three sunny sides, a shady side, floorboards, a gas inlet, and two gas outlets. The solar energy storage bed comprises: an upper air box, a lower air box, a plurality of solar heat collecting-storing pipes, and a sealing chamber. Each solar heat collecting-storing pipe comprising an air pipe. The air condenser comprises: an air inlet, an air outlet, two gas chambers, and a bundle of gas pipes. The solar greenhouse, the solar energy storage bed, the air condenser, the wet dust collectors are connected via pipes, and the valves and the blowers are disposed on the pipes. The solar greenhouse adopts a sealed frame structure. The top side and the three sunny sides are formed by polycarbonate (PC) sunlight panels, toughened glass panels, organic glass panels, or fiber-reinforced plastic (FRP) daylighting panels. The shady side is an energy storage wall. The floorboards in the solar greenhouse adopt perforated concrete floors. The perforated concrete floors are disposed above the ground, a space above the perforated concrete floors is utilized for placing materials to be dried, and a space beneath the perforated concrete floors is utilized for ventilation. The gas inlet is configured on the solar greenhouse beneath the floorboards and the two gas outlets are configured on the solar greenhouse above the floorboards. Each air pipe in the solar energy storage bed is provided with ventilation holes on a pipe wall thereof. Two ends of each air pipe communicate with the upper air box and the lower air box respectively. The pipe wall of each air pipe is covered with a heat storage material. The sealing chamber of the solar energy storage bed is formed by enclosing with the upper air box, the lower air box, a front transparent face plate, a rear nontransparent base plate, and side plates. All the solar heat collecting-storing pipes are disposed within the sealing chamber. The air condenser is in a structure of a cylinder. The air inlet and the air outlet are disposed on two sides of the cylinder respectively for introducing the air in and out of the air condenser. The two gas chambers are disposed at an upper opening and a lower opening of the cylinder respectively and communicate with each other via the bundle of gas pipes for introducing gas to be cooled. The gas inlet and one gas outlet of the solar greenhouse, the upper air box of the solar energy storage bed, the gas chamber disposed at an upper part of the air condenser, and the air outlet of the air condenser communicate via pipes. The other gas outlet of the solar greenhouse, the lower air box of the solar energy storage bed, and the air outlet of the air condenser communicate via pipes. The gas chamber disposed at a lower part of the air condenser communicates with the wet dust collector.

In a class of this embodiment, the heat storage material covered on the pipe wall of each air pipe is a mixture of an artificial zeolite and a metal powder; and a content of the artificial zeolite is higher than or equal to 70 wt. % of a total weight of the mixture.

In a class of this embodiment, a particle size of the artificial zeolite is smaller than or equal to 3 mm.

In a class of this embodiment, the face plate is a glass plate; and the base plate and the side plates are composite plates formed by plastic plates and insulation plates.

In a class of this embodiment, the energy storage wall of the solar greenhouse is constructed by an aerated concrete and a rock-wool thermal insulation layer and covered with an energy storage composite mortar, or constructed by hollow bricks filled with the energy storage composite mortar. A transformation heat of the energy storage composite mortar is higher than or equal to 60 kj/kg.

In a class of this embodiment, the top side of the solar greenhouse is a single inclined plane. The top side of the solar greenhouse is not limited to this shape and an arch-shaped or a triangle shaped top side is also practicable.

In a class of this embodiment, the air condenser and the bundle of the gas pipes disposed therein are made of 09CrCuSb alloy.

In a class of this embodiment, the solar greenhouse is a micro-pressure house, and a pressure therein is between 30000 and 70000 pascal, and preferably 50000 pascal.

Advantages of the integrated solar energy drying system of the invention are summarized as follows: the solar greenhouse and solar energy storage bed have optimal structures and can conduct heat exchange through radiation and convection, so that the system has high thermal efficiency and is energy saving. The entire drying system totally utilizes the solar energy, thus having low operation cost and being energy saving and environmentally friendly. The use of the solar energy storage bed also tackles the problem that the existing solar greenhouse is unable to use the solar energy at night. The system of the invention is adapted to dehydrate fruits and vegetables and to dry other agricultural products and biomass fuels, thus having positive effect in improving the agricultural economic benefit and lowering the transportation cost.

BRIEF DESCRIPTION OF THE DRAWINGS

The invention is described hereinbelow with reference to the accompanying drawings, in which.

Figure 1:
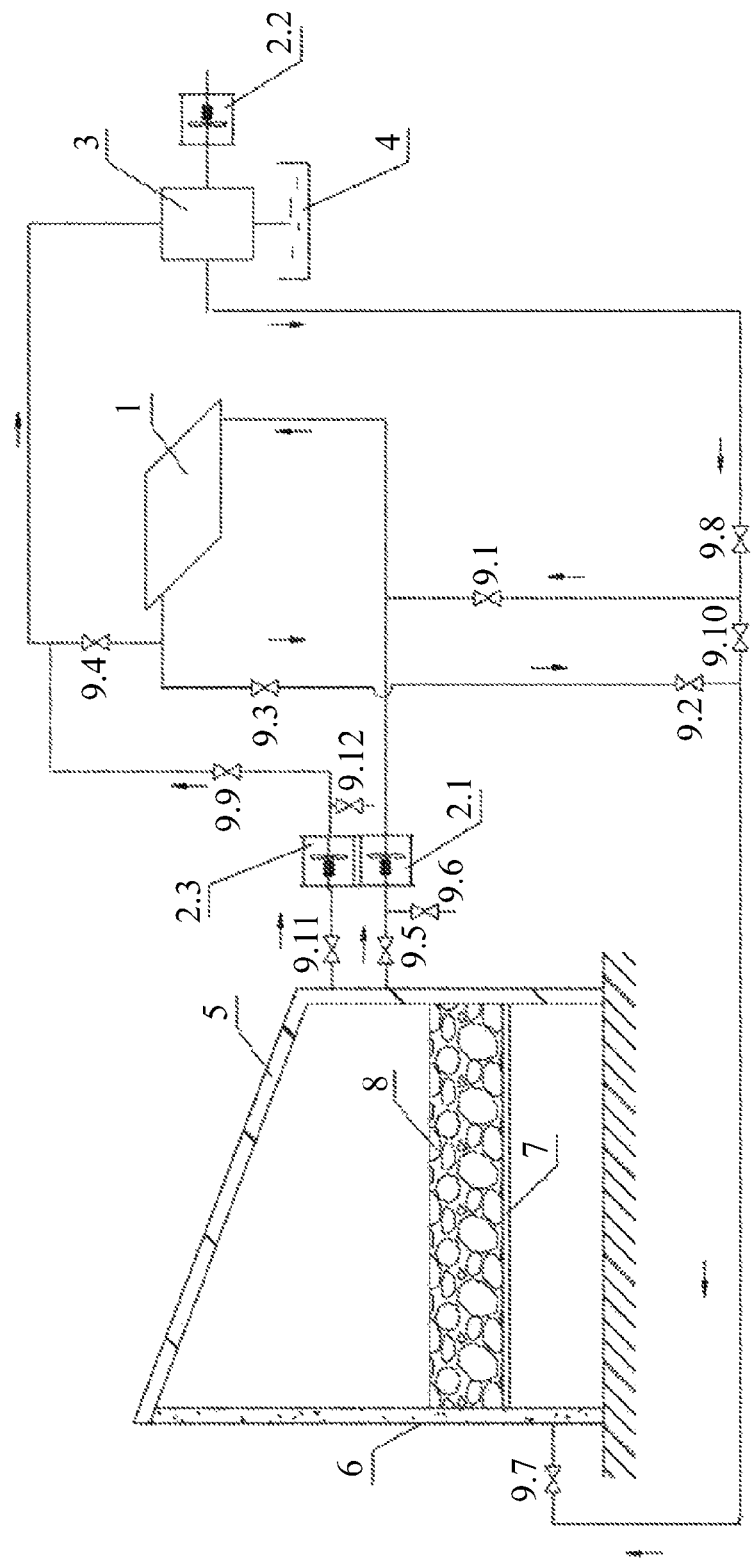
FIG. 1 is a schematic diagram of an integrated solar energy drying system illustrating in accordance with one embodiment of the invention.

In the drawings, the following reference numbers are used: 1. Solar energy storage bed; 1.11. Upper air box; 1.12. Lower air box; 1.2. Air pipe; 1.3. Solar heat collecting-storing pipe; 1.4. Face plate; 1.5. Base plate; 2.1, 2.2, 2.3. Blowers; 3. Air condenser; 3.1. Gas chamber; 3.2. Gas pipe; 3.3. Condenser housing; 4. Wet dust collector; 5. PC sunlight panel; 6. Energy storage wall; 7. Perforated concrete floors; 8. Materials; and 9.1-9.12. Valves.

DETAILED DESCRIPTION OF THE EMBODIMENTS

For further illustrating the invention, experiments detailing an integrated solar energy drying system are described below. It should be noted that the following examples are intended to describe and not to limit the invention.

An integrated solar energy drying system capable of collecting, storing, and supplying heat is as shown in FIG. 1. The system comprises: a solar greenhouse, a solar energy storage bed 1, an air condenser 3, a wet dust collector 4, pipes for connecting different apparatuses, and valves 9.1-9.12 and blowers 2.1-2.3 disposed on the pipes, which are specifically described as follows:

An arrangement of the solar greenhouse changes according to different locating regions and is based on the principle that a front side must face towards a direction of the strongest solar radiation, and the solar greenhouse on the north hemisphere is generally arranged with a front side faces toward the South and a rear side faces toward the North. A building structure of the solar greenhouse adopts a framed structure. A top side and sunny sides on the East, the West, and the South of the solar greenhouse are formed by PC sunlight panels 5. The PC sunlight panels 5 have the following physical features: high strength (a shock resistance thereof is 40 folds of that of a glass and 20 folds of a FRP), 90% of a transmittance, good thermal insulation property (which is 2 folds of that of the glass), light weight (which is ⅓ of that the glass), flame retardant, and not prone to condensation. The shady side in the North of the solar greenhouse is an energy storage wall 6. The energy storage wall 6 of the solar greenhouse is constructed by an aerated concrete and a rock-wool thermal insulation layer and covered with an energy storage composite mortar, or constructed by hollow bricks filled with the energy storage composite mortar. The energy storage composite mortar is prepared by mixing a graphite powder, an ash from a biomass power plant, a cement mortar, and water in the construction site, and a transformation heat of the energy storage composite mortar is higher than or equal to 60 kj/kg. The solar energy buildings or constructions generally adopt triangle roofs, and a preferred embodiment in the invention adopts a single top side with a slop for the purpose of enlarging a heating surface area of the solar energy. Floorboards of the solar greenhouse adopt perforated concrete floors 7, and the perforated concrete floors 7 are disposed at a position of one meter above the ground. A space above the perforated concrete floors 7 is utilized for placing materials 8 to be dried, and a space beneath the perforated concrete floors 7 is utilized for ventilation. In order to enhance the heat storage effect, an inner surface of the energy storage wall 6 and surfaces of the perforated concrete floors 7 are coated with a layer of the energy storage composite mortar having a thickness of 20 mm. The East side and the West side of the solar greenhouse (two sides that are in parallel to the paper in FIG. 1) are configured with a sealing door respectively for placing in and taken out the materials 8. No windows is configured on the solar greenhouse, and joint positions between steel structures and the PC sunlight panels 5 are required to be sealed for ensuring the sealing performance of the whole solar greenhouse. An inner surface of the solar greenhouse is coated with a far-infrared reflective coating to ensure a good heat storage effect and a uniform temperature therein.

Figure 2:
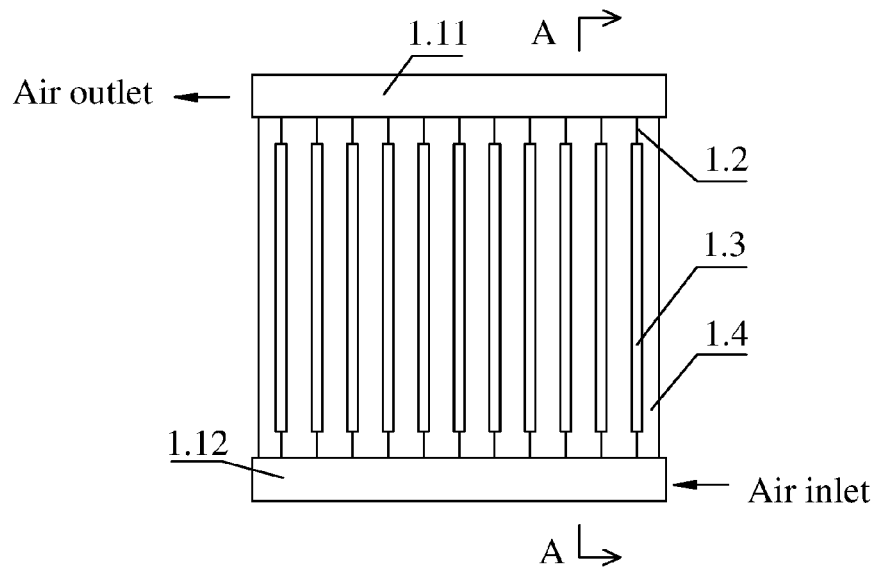
FIG. 2 is a structure diagram of a solar energy storage bed of FIG. 1.
Figure 3:
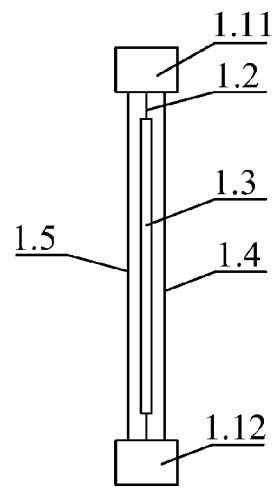
FIG. 3 is a sectional view taken from line A-A of FIG. 2.
Figure 4:
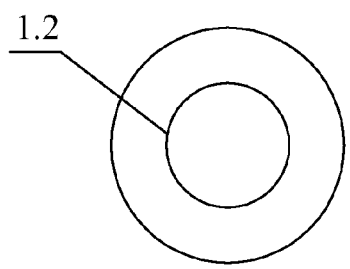
FIG. 4 is a cross sectional view of a solar heat collecting-storing pipe of FIG. 2.

As shown in FIGS. 2-4, the solar energy storage bed 1 comprises: an upper air box 1.11, a lower air box 1.12, a plurality of solar heat collecting-storing pipes 1.3, and a sealing chamber. Each solar heat collecting-storing pipe 1.3 comprises an air pipe 1.2 configured with ventilation holes on a pipe wall thereof. Two ends of each air pipe 1.2 communicate with the upper air box 1.11 and the lower air box 1.12 respectively. The pipe wall of each air pipe 1.2 is covered with a heat storage material. The sealing chamber is formed by enclosing with the upper air box 1.11, the lower air box 1.12, a front transparent face plate 1.4, a rear nontransparent base plate 1.5, and side plates. All the solar heat collecting-storing pipes 1.3 are disposed within the sealing chamber. The heat storage material in this embodiment is a mixture of an artificial zeolite and a metal powder, and a content of the artificial zeolite is higher than or equal to 70 wt. % of a total weight of the mixture. The artificial zeolite functions in heat storage while the metal powder primarily functions in heat conduction. The face plate 1.4 is a glass plate which allows the sunlight to transmit through and therefore preserves the heat. The base plate 1.5 and the side plates are composite plates formed by plastic plates and insulation plates which have poor heat conductivity but relatively good strength, thus functioning in heat preservation and supporting. The heat storage mode of the invention adopts the solid absorption type heat storage, which is superior to the sensible heat storage mode in its long term heat storage, no need for special heat preservation of the heat storage device, and low original investment and is superior to the latent heat storage in its large energy storage density. The solid heat storage material is required to possess the following features: 1) high energy storage density; 2) sufficient commodity supply and low price; 3) harmless and non-corrosive materials; 4) repeated use and regeneration; 5) large absorption capacity and relatively sensitive to the temperature at between 30 and 100° C.; 6) small absorption, low regeneration temperature, small residue after desorption of an adsorbate. Materials that currently satisfy the above requirements include zeolite, activated carbon, silica gel, activated alumina, and activated carbon fiber; and the corresponding adsorbate includes water, methanol, ethanol, ammonia, and chlorofluorocarbons. A particle size of the artificial zeolite is smaller than or equal to 3 mm. An effective heat storage density of the artificial zeolite is generally between 600 and 700 kj/kg, which enables the solar heat collecting-storing pipes 1.3 to possess relatively high thermal efficiency. The relatively small particle size is selected for ensuring that the gas fully contacts with the artificial zeolite. A length and a diameter of the solar heat collecting-storing pipes 1.3 are determined according to a load of the solar greenhouse. The larger the load of the solar greenhouse is, the longer the length and the larger the diameter of the solar heat collecting-storing pipes 1.3 are; and vice versa.

Figure 5:
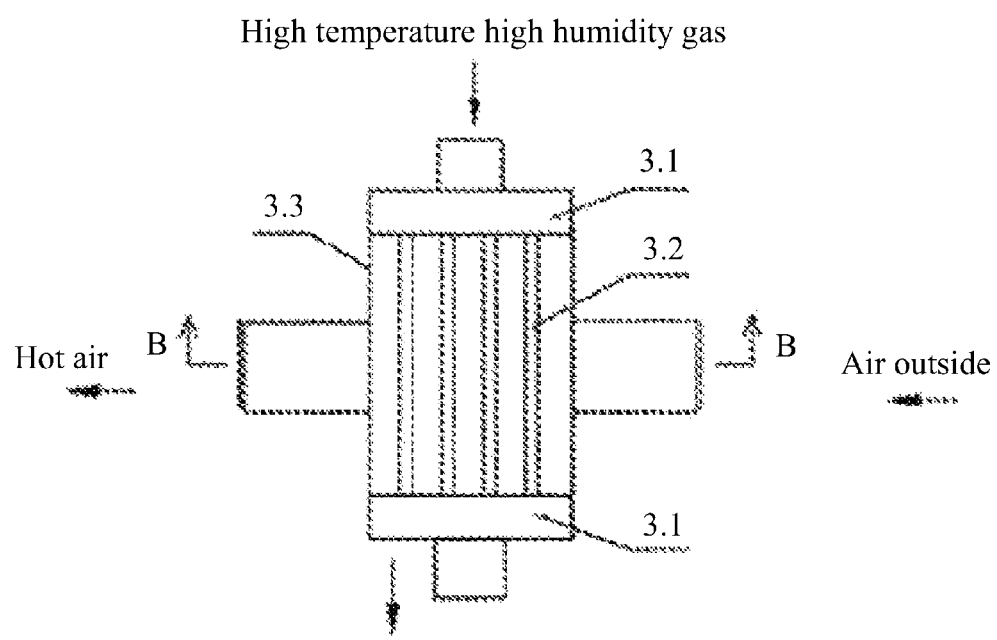
FIG. 5 is a structure diagram of an air condenser of FIG. 1.
Figure 6:
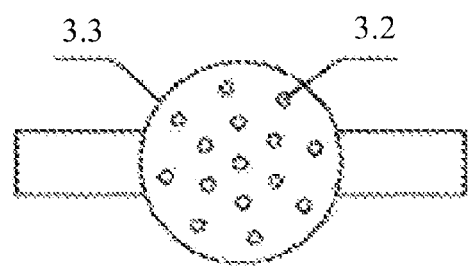
FIG. 6 is a sectional view taken from line B-B of FIG. 5.

The air condenser 3 is shown in FIGS. 5-6. A condenser housing 3.3 is in a structure of a cylinder. Two sides of the cylinder are configured with an air inlet and an air outlet respectively for introducing the air in and out of the air condenser. Two gas chambers 3.1 are disposed at an upper opening and a lower opening of the cylinder respectively and communicate with each other via a bundle of gas pipes 3.2 for introducing gas to be cooled. Considering that a high temperature high humidity gas is corrosive to a certain degree, the air condenser 3 and the bundle of the gas pipes 3.2 disposed therein are made of a steel, preferably made of an ND steel (with a steel grade of 09CrCuSb), and surfaces of the gas pipes are coated with three layers of anti-corrosive coatings. Thus, the high temperature high humidity gas flows in the bundle of the gas pipes 3.2 at a high speed, while the normal temperature air flows outside the bundle of the gas pipes 3.2. After the heat exchange, the condensed water is discharged, and the normal temperature air after being heated is used for drying the materials in the solar greenhouse.

The wet dust collector 4 is used to remove the dust in the gas, and an efficiency thereof exceeds 99%.

The apparatuses of the whole drying system are connected as FIG. 1. A gas inlet is configured on the solar greenhouse beneath the floorboards and two gas outlets are configured on the solar greenhouse above the floorboards so as to enable the flow direction in the solar greenhouse to satisfy the rule that thermal current raises. The gas inlet and one gas outlet of the solar greenhouse, the upper air box 1.11 of the solar energy storage bed 1, the gas chamber 3.1 disposed at an upper part of the air condenser 3, and the air outlet of the air condenser 3 communicate via pipes. The other gas outlet of the solar greenhouse, the lower air box 1.12 of the solar energy storage bed 1, and the air outlet of the air condenser 3 communicate via pipes. Valves 9.1-9.12 and blowers 2.1-2.3 are disposed at necessary positions of the pipes for realizing different working conditions. Some corresponding positions of the solar greenhouse are configured with detecting instruments, such as temperature indicators and pressure gauges, which are used to monitor and operate the working state of the whole system by technicians in a control room. The gas chamber 3.1 disposed at a lower part of the air condenser 3 communicates with the wet dust collector 4.

Working principle of the integrated solar energy drying system of the invention is as follows:

1) In day time, the materials 8 to be dried are placed into the solar greenhouse and the sealing doors are then closed to make the solar greenhouse in a sealing state;

1.2) The blower 2.3 is started and the valves 9.11, 9.12 are opened, while other valves and blowers are in a closed state. Air is continuously extracted out of the solar greenhouse until a pressure in the solar greenhouse reaches approximately 50000 pascal. It is indicated from the drying test of the tree barks as the materials 8 that a dehydration rate of the materials 8 under such pressure condition is approximately between 15% and 20% higher than that under the normal pressure, thus, the drying efficiency of the materials 8 is effectively improved. In addition, the control of the pressure in the solar greenhouse at approximately 50000 pascal can be totally realized, therefore the cost can be controlled within a relatively low range.

1.3) When the pressure gauge in the control room indicates that the pressure within the solar greenhouse reaches 50000 pascal, the blower 2.3 is turned off and all the valves are closed to make the inner side of the solar greenhouse in a sealing state. When the air outside the solar greenhouse penetrates inside and the pressure in the solar greenhouse raises to ≥60000 pascal, operations in steps 1.2) and 1.3) are repeated to ensure the pressure therein to be ≤50000 pascal.

1.4) As the room temperature in the solar greenhouse increases, water on surfaces of the materials 8 starts to evaporate when the temperature is larger than 30° C. When a humidity hygrometer in the control room indicates that the relative humidity inside the solar greenhouse reaches ≥90%, the blower 2.3 is started and the valves 9.11, 9.9 are opened, while other valves and blowers are closed, so that the high temperature high humidity gas in the solar greenhouse is introduced into the air condenser 3. At the same time, the blower 2.2 is started to extract the normal temperature air to cool the high temperature high humidity gas. The cooled high temperature high humidity gas and the condensed water are discharged into the wet dust collector 4, while the normal temperature air is heated and transported into the solar greenhouse to dry the materials. Then, the valves 9.7, 9.8, 9.10 are opened and the valves 9.1, 9.2, 9.5 and the blower 2.1 are closed, thus, the solar greenhouse is in a forced convection heating drying state. An air speed is control at approximately between 2 and 2.5 m/s.

1.5) When the humidity hygrometer in the control room indicates that the relative humidity in the solar greenhouse is ≤40%, all the blowers and valves are closed to make the solar greenhouse in a sealing state, steps 1.1)-1.4) are repeated, so that the materials are continuously dried by the solar energy.

At night after the sunset, the solar greenhouse is maintained only by the heat stored by the energy storage wall 6 and the perforated concrete floors 7 which is obviously insufficient in relative to the day time. Thus, in order to maintain the good drying condition, the solar energy collected and stored by the solar energy storage bed 1 in the day time must be dependent on. The solar energy storage bed 1 is operated as follows:

2.1) the heat storage process of the solar energy storage bed during day time is generally as follows: in the day time, the particles of the artificial zeolite absorbs the solar energy and the temperature thereof raises, water starts to desorb from the artificial zeolite, and the solar energy storage bed 1 starts to store heat. In order to facilitate the process, the valves 9.1, 9.4 are opened and the blower 2.2 is started when the solar greenhouse is in the forced convection heating drying state, so that a part of the air heated by the air condenser 3 is introduced to the solar energy storage bed 1 to carry away the desorbed water vapor, and the produced high temperature high humidity gas is transported to the air condenser 3. When the humidity of the gas at the outlet of the solar energy storage bed 1 is smaller than 50%, the valves 9.1, 9.4, 9.5 and the blower 2.1 can be closed to transport all the normal temperature air after being heated by the air condenser to the solar greenhouse.

2.2) When the temperature in the solar greenhouse is decreased to 28° C. below, the stored heat of the solar energy storage bed 1 is utilized to dry the materials 8. Then, the valves 9.1, 9.4, 9.6, 9.12 are closed while other valves and blowers are all started. The process will not be stopped until that the temperature of the solar energy storage bed 1 is lower than the temperature of the solar greenhouse.

The key of the integrated solar energy drying system of the invention is the arrangement of the solar greenhouse and the solar energy storage bed 1. The system is integrated with the heat supply, heat collection, and heat storage as a whole has high thermal efficiency, and is capable of utilizing the solar energy at night. Furthermore, the micro-pressure solar energy drying technology is utilized to improve the drying and dehydration rate, and the drying airflow organization is also reasonably designed. The protection scope of the invention is not limited by the above embodiments. Unless otherwise indicated, the numerical ranges involved in the invention include the end values. While particular embodiments of the invention have been shown and described, it will be obvious to those skilled in the art that changes and modifications may be made without departing from the invention in its broader aspects. For example, a preferable scheme of the invention adopts the PC sunlight panels 5 as the top side and the three sunny sides, but the toughened glass panels, the organic glass panels, and the FRP daylighting panels are also practicable. The heat storage material in the solar heat collecting-storing pipes 1.3 adopting the artificial zeolite is also a preferable technical scheme of the invention since the artificial zeolite has high heat storage density, stable heat storage, and low production cost, whereas other proper common solid energy storage materials can also be adopted, such as the activated carbon, the silica gel, the activated alumina, and the activated carbon fiber. The face plate 1.4 and the base plate 1.5, the shape of the top side of the solar greenhouse, the material of the energy storage wall can also be regulated according to practical conditions. The air condenser 3 is not limited to the ND steel and can also be made of other materials possessing good heat transfer performance and good anti-corrosion performance. The control of the pressure inside the solar greenhouse at 50000 pascal during the normal work is the selection that takes into consideration of the factors including operation, the technical effect, and the production cost. The pressure controlled at between 30000 and 70000 pascal can also reach the good effect. Therefore, the aim in the appended claims is to cover all such changes and modifications as fall within the true spirit and scope of the invention.

The invention claimed is:

1. An integrated solar energy drying system, comprising:
 a) a solar greenhouse, the solar greenhouse comprising: a top side, three sunny sides, a shady side, floorboards, a gas inlet, and two gas outlets;
 b) a solar energy storage bed, the solar energy storage bed comprising: an upper air box, a lower air box, a plurality of solar heat collecting-storing pipes, and a sealing chamber; each solar heat collecting-storing pipe comprising an air pipe;
 c) an air condenser, the air condenser comprising: an air inlet, an air outlet, two gas chambers, and a bundle of gas pipes;
 d) a wet dust collector;
 e) pipes;
 f) valves; and
 g) blowers;

wherein
 the solar greenhouse, the solar energy storage bed, the air condenser, the wet dust collectors are connected via the pipes, and the valves and the blowers are disposed on the pipes;
 the solar greenhouse adopts a sealed frame structure; the top side and the three sunny sides are formed by polycarbonate sunlight panels, toughened glass panels, organic glass panels, or fiber-reinforced plastic daylighting panels; the shady side is an energy storage wall; the floorboards in the solar greenhouse adopt perforated concrete floors; the perforated concrete floors are disposed above the ground, a space above the perforated concrete floors is utilized for placing materials to be dried, and a space beneath the perforated concrete floors is utilized for ventilation; the gas inlet is configured on the solar greenhouse beneath the floorboards and the two gas outlets are configured on the solar greenhouse above the floorboards;
 two ends of each air pipe communicate with the upper air box and the lower air box, respectively; the pipe wall of each air pipe is covered with a heat storage material; the sealing chamber of the solar energy storage bed is formed by enclosing with the upper air box, the lower air box, a front transparent face plate, a rear nontransparent base plate, and side plates; and all the solar heat collecting-storing pipes are disposed within the sealing chamber;
 the air condenser is in a structure of a cylinder; the air inlet and the air outlet are disposed on two sides of the cylinder respectively for introducing the air in and out of the air condenser; the two gas chambers are disposed at an upper opening and a lower opening of the cylinder respectively and communicate with each other via the bundle of gas pipes for introducing gas to be cooled; and
 the gas inlet and one gas outlet of the solar greenhouse, the upper air box of the solar energy storage bed, the gas chamber disposed at an upper part of the air condenser, and the air outlet of the air condenser communicate via pipes; the other gas outlet of the solar greenhouse, the lower air box of the solar energy storage bed, and the air outlet of the air condenser communicate via pipes; and the gas chamber disposed at a lower part of the air condenser communicates with the wet dust collector.

2. The system of claim 1, wherein the heat storage material covered on the pipe wall of each air pipe is a mixture of an artificial zeolite and a metal powder; and a content of the artificial zeolite is higher than or equal to 70 wt. % of a total weight of the mixture.

3. The system of claim 2, wherein a particle size of the artificial zeolite is smaller than or equal to 3 mm.

4. The system of claim 1, wherein the face plate is a glass plate; and the base plate and the side plates are composite plates formed by plastic plates and insulation plates.

5. The system of claim 2, wherein the face plate is a glass plate; and the base plate and the side plates are composite plates formed by plastic plates and insulation plates.

6. The system of claim 3, wherein the face plate is a glass plate; and the base plate and the side plates are composite plates formed by plastic plates and insulation plates.

7. The system of claim 1, wherein the energy storage wall of the solar greenhouse is constructed by an aerated concrete and a rock-wool thermal insulation layer and covered with an energy storage composite mortar, or constructed by hollow bricks filled with the energy storage composite mortar; and a transformation heat of the energy storage composite mortar is higher than or equal to 60 kj/kg.

8. The system of claim 2, wherein the energy storage wall of the solar greenhouse is constructed by an aerated concrete and a rock-wool thermal insulation layer and covered with an energy storage composite mortar, or constructed by hollow bricks filled with the energy storage composite mortar; and a transformation heat of the energy storage composite mortar is higher than or equal to 60 kj/kg.

9. The system of claim 3, wherein the energy storage wall of the solar greenhouse is constructed by an aerated concrete and a rock-wool thermal insulation layer and covered with an energy storage composite mortar, or constructed by hollow bricks filled with the energy storage composite mortar; and a transformation heat of the energy storage composite mortar is higher than or equal to 60 kj/kg.

10. The system of claim 1, wherein the top side of the solar greenhouse is a single inclined plane.

11. The system of claim 2, wherein the top side of the solar greenhouse is a single inclined plane.

12. The system of claim 3, wherein the top side of the solar greenhouse is a single inclined plane.

13. The system of claim 1, wherein the air condenser and the bundle of the gas pipes disposed therein are made of 09CrCuSb alloy.

14. The system of claim 2, wherein the air condenser and the bundle of the gas pipes disposed therein are made of 09CrCuSb alloy.

15. The system of claim 3, wherein the air condenser and the bundle of the gas pipes disposed therein are made of 09CrCuSb alloy.

16. The system of claim 1, wherein the solar greenhouse is a micro-pressure house, and a pressure therein is between 30000 and 70000 pascal.

17. The system of claim 2, wherein the solar greenhouse is a micro-pressure house, and a pressure therein is between 30000 and 70000 pascal.

18. The system of claim 3, wherein the solar greenhouse is a micro-pressure house, and a pressure therein is between 30000 and 70000 pascal.

19. The system of claim 16, wherein the pressure in the solar greenhouse is 50000 pascal.

20. The system of claim 17, wherein the pressure in the solar greenhouse is 50000 pascal.

* * * * *